United States Patent
Spoto et al.

(10) Patent No.: US 6,278,358 B1
(45) Date of Patent: Aug. 21, 2001

(54) SECONDARY SEAT BELT WARNING SYSTEM

(75) Inventors: Thomas Anthony Spoto, Birmingham; Daniel M. King, Belleville; Mark Anthony Cuddihy, New Boston; Rouaa Nakhieh, Northville; Thomas Michael McQuade, Ann Arbor, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/488,352

(22) Filed: Jan. 20, 2000

(51) Int. Cl.[7] .................................................. B60Q 1/00
(52) U.S. Cl. .................. 340/425.5; 340/457; 340/457.1; 340/438; 340/459; 340/660
(58) Field of Search .................. 340/425.5, 457.1, 340/457, 438, 459, 660

(56) References Cited

U.S. PATENT DOCUMENTS

| | | | |
|---|---|---|---|
| 3,967,237 | 6/1976 | Jenne | 340/52 E |
| 4,348,726 | * 9/1982 | Igarashi et al. | 364/424 |
| 4,555,690 | * 11/1985 | Fukushima et al. | 340/52 F |
| 4,667,336 | * 5/1987 | Best | 377/15 |
| 4,849,733 | 7/1989 | Conigliaro et al. | 340/52 E |
| 5,076,609 | 12/1991 | Park | 280/804 |
| 5,365,438 | * 11/1994 | Mitchell et al. | 364/424.03 |
| 5,483,221 | * 1/1996 | Mutter et al. | 340/457.1 |
| 5,547,039 | * 8/1996 | Berger et al. | 180/287 |
| 5,596,312 | 1/1997 | Fowler et al. | 340/457.1 |
| 5,714,930 | 2/1998 | McKinney, Jr. | 340/468 |
| 5,760,684 | 6/1998 | Orbach | 340/457.1 |
| 5,780,937 | 7/1998 | Kong | 340/426 |
| 5,966,784 | * 10/1999 | Arbogast et al. | 24/633 |
| 6,002,325 | 12/1999 | Conaway | 340/384.1 |

FOREIGN PATENT DOCUMENTS 9955560   11/1999   (WO) .

* cited by examiner

*Primary Examiner*—Jeffery Hofsass
*Assistant Examiner*—Hung Nguyen
(74) *Attorney, Agent, or Firm*—David B. Kelley

(57) ABSTRACT

A secondary seat belt warning system for alerting a vehicle occupant when a seat belt is unbuckled. The secondary seat belt warning system includes an ignition switch for generating a signal indicating an ignition in an on position, a seat belt sensor for generating a signal indicating that the seat belt is unbuckled, and a seat belt indicator for producing an audible and visible indicator to the vehicle occupant. The secondary seat belt warning system also includes a control module to activate the seat belt indicator in response to the input from the ignition switch and seat belt sensor. The secondary seat belt warning system further includes a vehicle speed sensor to activate the secondary seat belt warning system when the control module receives a signal above a predetermined threshold from the speed sensor indicative of the vehicle speed.

20 Claims, 2 Drawing Sheets

SECONDARY SEAT BELT WARNING SYSTEM

BACKGROUND OF THE INVENTION

1. Field of the Invention

The present invention relates generally to a secondary seat belt warning system and, more specifically, to a secondary seat belt warning system that triggers a recurring alarm when a seat belt is unbuckled.

2. Description of the Related Art

It is commonly known that automotive vehicles often include seat belt warning systems for reminding the occupant of the vehicle that their seat belt is unbuckled. Typically, when the vehicle ignition is turned to a "run" or "on" position, an audible chime and visible warning light will turn on for a predetermined amount of time to alert, or remind, the occupant to fasten their seat belt. If their seat belt is already buckled, neither the chime nor the light will turn on. The audible chime will typically only sound for a few seconds and the visible warning light will typically flash for a short period of time or remain illuminated for approximately ten to sixty seconds. After these relatively short time durations have expired, the alarms will turn off and remain off; regardless of whether the seat belt is buckled or unbuckled, until the initial ignition "run" position is reactivated.

Although the current seat belt warning systems remind the occupant to buckle their seat belt, the warning systems occur for only a short period of time during initial operation of the vehicle and are not programmable. Therefore, there is a need to provide an additional or secondary seat belt warning system which continuously warns the occupant of the vehicle to buckle their seat belt during prolonged periods of operation of the vehicle and is programmable by the vehicle operator.

SUMMARY OF THE INVENTION

Accordingly, the present invention is a secondary seat belt warning system for alerting an occupant of a vehicle when a seat belt is unbuckled. The secondary seat belt warning system includes a control module for activating at least one output warning signal in response to receiving a plurality of predetermined control feedback input signals. The secondary seat belt warning system includes an ignition switch connected to the control module for producing an input signal to the control module indicative of a state of a vehicle ignition between an off position and an on position. The secondary seat belt warning system also includes a seat belt sensor connected to the control module for producing an input signal to the control module indicative of a state of the seat belt between a buckled and unbuckled condition. The secondary seat belt warning system further includes a vehicle speed sensor connected to the control module for producing an input signal to the control module in response to the vehicle speed sensor measuring a predetermined threshold speed of the vehicle. Finally, the secondary seat belt warning system includes a seat belt indicator system connected to the control module for producing an output signal in response to the control module receiving an input signal from the seat belt sensor in the unbuckled condition and an input signal from the vehicle speed sensor above the predetermined threshold, whereby the output signal triggers at least one of an audible and visible indicator to alert the occupant of the vehicle of the unbuckled condition of the seat belt.

The present invention further includes a method of producing a seat belt indicator signal indicative of an unbuckled condition of a vehicle seat belt. The method includes the steps of detecting a state of a vehicle ignition between an off position and an on position, detecting a speed of the vehicle, detecting a state of the vehicle seat belt between a buckled and unbuckled condition, and producing an output signal. The method also includes the steps of triggering a seat belt indicator when the ignition on position is detected, the seat belt unbuckled condition is detected and the detected vehicle speed is above a predetermined threshold.

The present invention also includes a method of programming a secondary seat belt warning system between an enabled status for alerting an occupant of a vehicle when a seat belt is unbuckled and a disabled status wherein the vehicle includes a seat belt and the secondary seat belt warning system includes a control module connected to an ignition switch, a headlamp switch and a visible indicator. The method includes the steps of initializing the secondary seat belt warning system by positioning the ignition switch in an off position and the seat belt in an unbuckled condition and then activating the ignition switch from the initialized off position to an on position. The method also includes the steps of manipulating the seat belt a predetermined number of cycles between a buckled condition and the unbuckled condition and then activating the headlamp switch from an on position to an off position. The method includes the steps of manipulating the seat belt a predetermined number of cycles between the buckled condition and the unbuckled condition and confirming activation of the visible indicator from an illuminated state to an off condition. The method additionally includes the steps of manipulating the seat belt a final predetermined number of cycles between the buckled condition and the unbuckled condition and checking the secondary seat belt warning system for confirmation of the state of the system between the enabled and disable status.

Other features and advantages of the present invention will be readily appreciated as the same becomes better understood after reading the subsequent description when considered in connection with the accompanying drawings.

DESCRIPTION OF THE PREFERRED EMBODIMENT(S)

Figure 1:
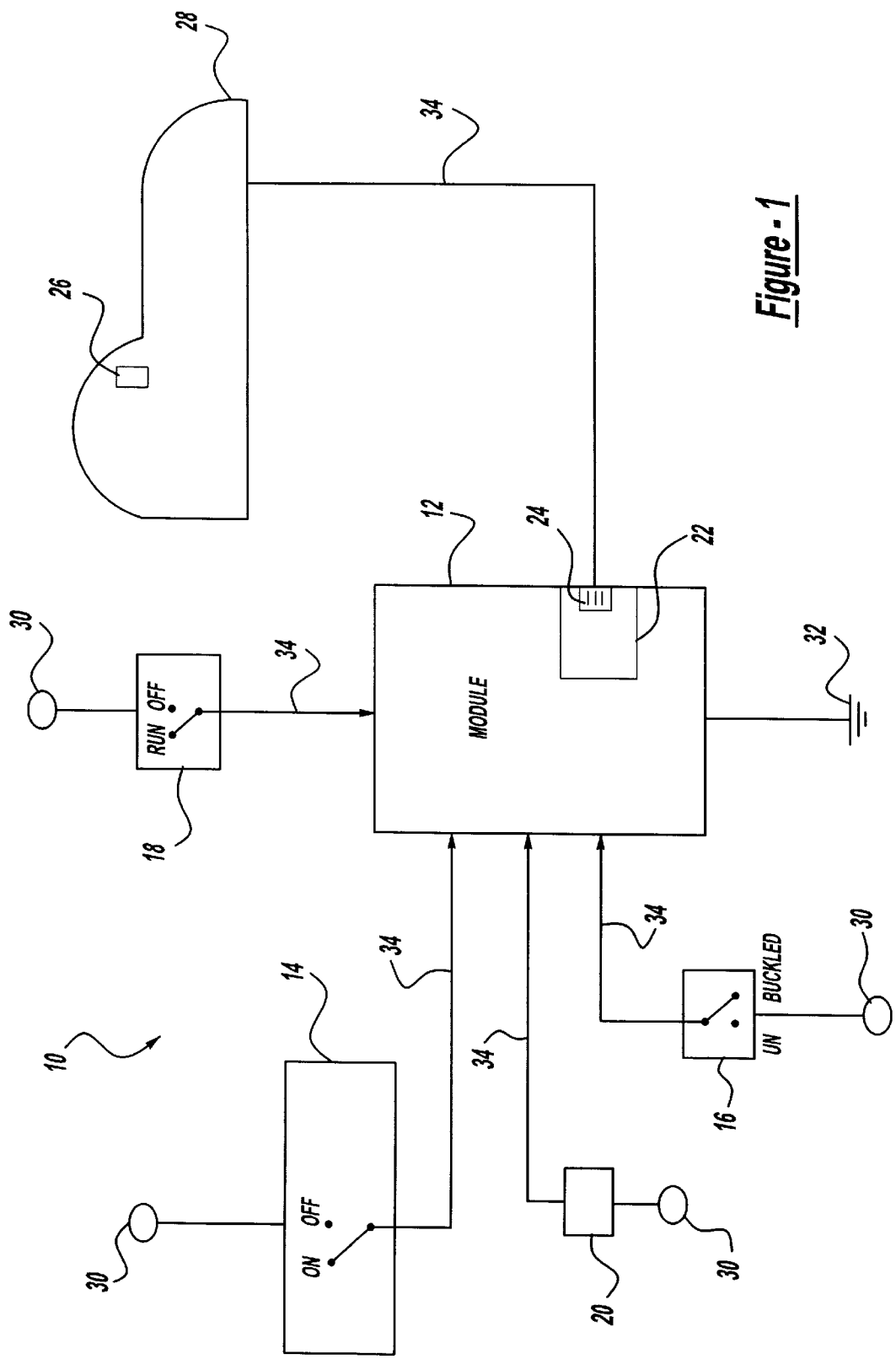
FIG. 1 is a schematic view of a secondary seat belt warning system, according to the present invention.

Referring to the drawings and in particular FIG. 1, one embodiment of a secondary seat belt warning system 10 for alerting an occupant of a vehicle when a seat belt is unbuckled, according to the present invention, is shown. The secondary seat belt warning system 10 includes a control module 12 for activating audible and visible output signals in response to receive a plurality of predetermined control feedback input signals. The secondary seat belt warning system 10 also includes a plurality of input devices 14, 16, 18, 20 for generating the input signals. A headlamp switch 14 provides an input signal for programming the control module 12 between an enabled and disabled status, as will be discussed in greater detail herein below. A seat belt sensor 16 provides an input signal to the control module 12 indicating whether the seat belt (not shown) is in a buckled or unbuckled state. That is, each seat belt within the vehicle includes a female member or buckle (not shown) for receiving a male member or latch plate (not shown) within the buckle, a latch plate (not shown) and a locking mechanism (not shown) to lock and unlock the seat belt, as is commonly known in the art. An ignition switch 18 provides an input signal to the control module 12 indicating when a vehicle ignition (not shown) transitions from an "off" position to an "on" position, i.e. powered operation of the vehicle. The "on" position is typically when the ignition 18 is in either the engine start condition or the run condition, as are commonly known in the art. Additionally, a vehicle speed sensor 20 provides an input signal to the control module 12 indicative of the speed of the vehicle, typically measured in miles per hour.

The secondary seat belt warning system 10 also includes an output device such as a seat belt indicator system 22. The seat belt indicator system 22, according to the present invention, is integrated into the control module 12 for activating an audible indicator device 24, such as a loudspeaker, and a visible indicator device 26, such as a seat belt warning light. The seat belt indicator system 22 may also be integrated into a dash cluster 28 of the vehicle. The audible indicator 24 is integral with the seat belt indicator system 22 and the control module 12 and the visible indicator 26 is mounted within the dash cluster 28 of the vehicle, which is conventional and commonly known in the art.

Finally, the control module 12 and each of the input and output devices 14 through 26 are powered by a vehicle battery/fuse box system 30 and the secondary seat belt warning system 10 is grounded at 32 to the vehicle frame (not shown). The input and output devices 14 through 26 are connected to the control module 12 and battery/fuse box system 30 via electrical connectors illustrated at 34.

Figure 2:
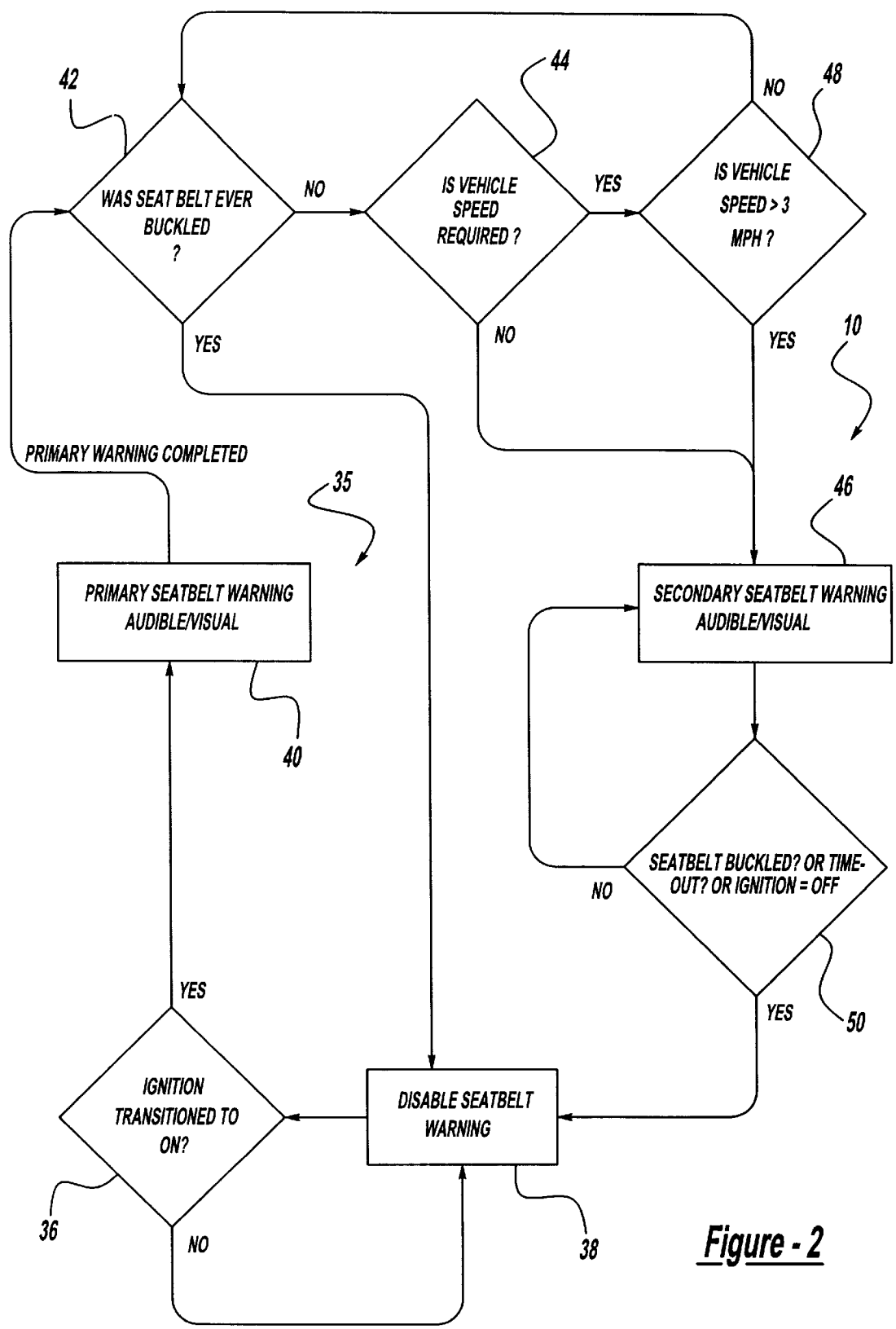
FIG. 2 is a flow diagram of the operation of a primary seat belt warning system and the secondary seat belt warning system of FIG. 1.

In operation, the secondary seat belt warning system 10 is a supplemental warning system that augments a primary seat belt warning system 35. Referring to FIG. 2, in the primary seat belt warning system 35, when the ignition switch 18 is turned to the "on" position, an input signal is transmitted to the control module 12. An input signal is also transmitted to the control module 12 from the seat belt sensor 16. If the seat belt sensor 16 transmits a signal indicative of a buckled seat belt, the seat belt indicator 22 remains inactive, i.e. no audible or visible indicator 24, 26 is triggered. If the seat belt sensor 16 transmit a signal indicative of an unbuckled seat belt, the control module 12 activates the audible indicator 24 of the seat belt indicator 22 to trigger an audible chime for approximately six seconds. Simultaneously, the control module 12 activates the visible indicator 26 of the seat belt indicator 22 to trigger the seat belt warning light "on" for approximately sixty seconds. The primary seat belt warning system 35 is deactivated after the prescribed time intervals, regardless of whether the seat occupant buckles the seat belt or not.

Once the primary seat belt warning system 35 is deactivated or completed, if the seat belt is still not detected in the buckled condition by the seat belt sensor 16, then the secondary seat belt warning system is activated. First, the seat belt sensor 16 detects whether the seat belt is in the buckled or unbuckled condition. If the seat belt sensor 16 indicates a signal indicative of a buckled seat belt, the seat belt indicator 22 remains inactive and the audible 24 and visible 26 indicators remain off. However, if the control module 12 receives a signal from the seat belt sensor 16 indicative of an unbuckled seat belt, the control module 12 detects whether there is an input signal from a vehicle speed sensor 20 in the vehicle. If the control module 12 does not receive an input signal for a vehicle speed sensor 20, i.e the vehicle is not equipped with a vehicle speed sensor, the secondary seat belt warning system 10 is activated and the seat belt indicator 22 in the control module 12 is actuated. First, the audible indicator 24 will transmit an intermittent chime at 240 rep/min at a frequency of 740 Hz. Second, the visible indicator 26 will display the seat belt warning light in the cluster 28. The seat belt warning light will also intermittently flash, simultaneously, with the audible chime at 240 rep/min. Alternatively, the seat belt warning light may illuminated continuously during the audible chime.

However, if the secondary seat belt warning system 10 and the vehicle does include a vehicle speed sensor 20, the control module 12 will receive an input signal from the vehicle speed sensor 20 to determine whether to activate the secondary seat belt warning system 10. If the control module 12 receives an input signal from the vehicle speed sensor 20 which exceeds a vehicle speed threshold of three miles per hour, the secondary seat belt warning system 10 is activated and the seat belt indicator 22 is also actuated. Again, the audible indicator 24 will transmit an intermittent chime at 240 rep/min at a frequency of 740 Hz. And the visible indicator 26 will display the seat belt warning light in the dash cluster 28.

The secondary seat belt warning system 10 is deactivated only when one of three conditions is satisfied. First, the secondary seat belt warning system 10 will be deactivated if the control module 12 receives a signal from the ignition switch 18 indicating that the ignition has been switched to the "off" position. Second, the secondary seat belt warning system 10 will be deactivated if the control module 12 receives a signal from the seat belt sensor 16 indicating that the seat occupant has buckled their seat belt. Third, the secondary seat belt warning system 10 will be deactivated after five minutes have elapsed since initial activation.

Finally, if the seat occupant buckles their seat belt prior to the secondary seat belt warning system 10 being activated, the secondary seat belt warning system 10 will remain inactive until the proper conditions are met and the predetermined signals are received by the control module 12, as described above, on the next ignition cycle from the "off" position to the "on" position. Additionally, if the seat occupant buckles and then unbuckles their seat belt, the secondary seat belt warning system 10 will not provide a warning after the seat belt is unbuckled until the next ignition cycle.

Referring to FIG. 2, a method, according to the present invention, of producing a seat belt indicator 22 indicative of an unbuckled condition of a vehicle seat belt (not shown) by the primary seat belt warning system 35 and the secondary seat belt warning system 10 is shown. The method begins in diamond 36 by the ignition switch 18 detecting a state of the vehicle ignition between an off position and an on position. It should be appreciated that the ignition switch 18 may be programmed to detected between an "accessory" position and a "start" position as well. If the ignition switch 18 detects the vehicle ignition in an off position, the method advances to block 38. In block 38, the primary seat belt warning system 35 is disabled and neither the audible indicator 24 nor visible indicator 26 will be activated.

If the ignition switch 18 and control module 12 detect the vehicle ignition in the on position, the method advances to block 40. In block 40, the primary seat belt warning system 35 is activated. If the seat belt sensor 16 and the control module 12 detect the state of the vehicle seat belt in the unbuckled condition, the audible indicator 24 and visible indicator 26 are activated, as previously described. Again, in the preferred embodiment of the present invention, the audible indicator 24 produces a chime for approximately six seconds and the visible indicator 26 simultaneously produces a steady seat belt warning light for approximately sixty seconds.

From block 40, once the primary seat belt warning system 35 is completed, the method advances to diamond 42 to determine whether the seat belt was ever buckled. In diamond 42, if the seat belt has been buckled, the method advances to block 38 and both the primary seat belt warning system 35 and the secondary seat belt warning system 10 are disabled and neither the audible indicator 24 nor visible indicator 26 are activated. If the seat belt sensor 16 has not detected the seat belt in the buckled condition, the method advances to diamond 44.

In diamond 44, the secondary seat belt warning system 10 and control module 12 determine if a vehicle speed sensor 20 is present in the system 10. In other words, the secondary seat belt warning system 10 may operate with or without the presence of the vehicle speed sensor 20. If the control module 12 does not detect the presence of the vehicle speed sensor 20 then the method advances to block 46 to automatically activate the secondary seat belt warning system 10, as will be further described below. If, however, the control module 12 does detect the presence of the vehicle speed sensor 20, then the method advances to diamond 48. In diamond 48, the vehicle speed sensor 20 and control module 12 detect whether the speed of the vehicle has exceeded the predetermined threshold speed of three miles per hour. If the speed of the vehicle is less than three miles per hour, then the method advances to diamond 42 to initiate the method of detecting whether the seat belt is in the buckled or unbuckled condition again. However, if the speed of the vehicle is greater than or equal to three miles per hour, then the method advances to block 46.

In block 46, the seat belt indicator 22 is activated to produce an audible signal from the audible indicator 24 and a visible signal from the visible indicator 26. In block 46, the audible indicator will transmit an intermittent chime at 240 rep/min at a frequency of 740 Hz and the visible indicator 26 will display the seat belt warning light. As previously discussed, the seat belt warning light may be either constantly illuminated or intermittently flash, simultaneously, with the audible chime at 240 rep/min.

Finally, the method advances from block 46 to diamond 50 to determine whether one of the three conditions for deactivation of the secondary seat belt warning system has been satisfied, as previously described herein above. If one of the conditions for deactivation has not been satisfied, the method recycles to block 46 for the activation of the seat belt indicator 22. If one of the conditions for deactivation has been satisfied, the method advances to block 38 and the secondary seat belt warning system 10 is disabled. The secondary seat belt warning system 10 may also be enabled and disabled through vehicle operator programming. The method uses the headlamp switch 14 and the seat belt sensor 16 to toggle the secondary seat belt warning system 10 between an enabled and a disabled status as follows. First, start with the ignition switch 18 in the "off" position and the driver's seat belt unbuckled. Next, turn the ignition switch 18 to the "run" position. The primary seat belt warning system 10 will trigger the visible indicator 26 on. After the visible indicator 26 turns off, approximately one minute, buckle then unbuckle the driver's seat belt three times, ending in an unbuckled state. Then, turn on the headlamp switch 14 and turn off the headlamp switch 14. Again, buckle and unbuckle the driver's seat belt three times, ending in the unbuckled state. The two cycles of buckling and unbuckling of the seat belt must occur within sixty seconds of completion of the primary warning system or the operator must start the programming method from the beginning. After the final unbuckled state has been reached, the visible indicator 26 will be illuminated for approximately three seconds. After the visible indicator 26 turns off, buckle then unbuckle the driver's seat belt one time. At this stage, the secondary seat belt warning system 10 will be enabled if it is currently disabled, or it will be disabled if it is currently enabled. If the seat belt is not buckled and unbuckled within ten second of the visible indicator 26 turning off, the programming will end and the status will remain unchanged.

Confirmation of the secondary seat belt warning system 10 being enabled is provided to the vehicle operator by flashing the visible indicator 26 four times per second for three seconds, followed by three seconds with the visible indicator 26 off, then followed by flashing the visible indicator 26 four times per second for three seconds again. Confirmation of the secondary seat belt warning system 10 being disabled is provided to the operator by flashing the visible indicator 26 four times per second for three seconds only. Programming of the secondary seat belt warning system 10 is automatically exited after completion of the confirmation. It should be appreciated that any of the predetermined cycle times of the audible 24 and visible 26 indicators may vary as well as the threshold speed set by the vehicle speed sensor 20 without varying from the scope of the invention.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A secondary warning system for alerting a vehicle occupant when a seat belt is unbuckled comprising:

a control module for activating at least one output warning signal in response to receiving a plurality of predetermined control feedback input signals;

an ignition switch connected to said control module for producing an input signal to said control module indicative of a state of a vehicle ignition between an off position and an on position;

a seat belt sensor connected to said control module for producing an input signal to said control module indicative of a state of a vehicle seat belt between a buckled and unbuckled condition;

a vehicle speed sensor connected to said control module for producing an input signal to said control module in response to said vehicle speed sensor measuring a predetermined threshold speed of the vehicle; and a seat belt indicator system connected to said control module for producing an output signal for triggering a primary seat belt indicator when the state of the vehicle ignition is in the on position and said seat belt sensor in said unbuckled condition for a first predetermined period of time and producing an output signal for triggering a secondary seat belt indicator in response to said control module receiving an input signal from said seat belt sensor in said unbuckled condition and an input signal from said vehicle speed sensor above said predetermined threshold after expiration of the first predetermined period of time, whereby the output signal triggers at least one of an audible and visible indicator to alert the occupant of the vehicle of said unbuckled condition of said vehicle seat belt.

2. A secondary warning system as set forth in claim 1 including a headlamp switch connected to said control module for producing an input signal to said control module indicative of a state of vehicle headlamps between an on and off condition.

3. A secondary warning system as set forth in claim 1 wherein said audible indicator includes a loudspeaker and said visible indicator includes a seat belt warning light.

4. A secondary warning system as set forth in claim 3 wherein said audible indicator is mounted within a dash cluster of the vehicle.

5. A secondary warning system as set forth in claim 1 including a power supply for providing electrical power to said secondary warning system.

6. A method of producing a seat belt indicator signal indicative of an unbuckled condition of a vehicle seat belt comprising the steps of:
   detecting a state of a vehicle ignition between an off position and an on position;
   detecting a speed of the vehicle;
   detecting a state of the vehicle seat belt between a buckled and unbuckled condition;
   producing an output signal and triggering a primary seat belt indicator when the ignition run condition is detected and the seat belt unbuckled condition is detected for a first predetermined period of time; and
   producing an output signal and triggering a seat belt indicator when the ignition run condition is detected, the seat belt unbuckled condition is detected and the detected vehicle speed is above a predetermined threshold after expiration of the first predetermined period of time.

7. A method as set forth in claim 6 wherein said step of triggering of the seat belt indicator includes producing an audible signal.

8. A method as set forth in claim 6 wherein said step of triggering of the seat belt indicator includes producing a visible signal.

9. A method as set forth in claim 6 wherein said step of triggering of the seat belt indicator includes simultaneously producing an audible and visible signal.

10. A method as set forth in claim 6 including the step of terminating the seat belt indicator after a predetermined period of time has been detected.

11. A method as set forth in claim 6 including the step of terminating the seat belt indicator when the ignition off position is detected.

12. A method as set forth in claim 6 including the step of terminating the seat belt indicator when the seat belt buckled condition is detected.

13. A method of producing a seat belt indicator signal indicative of an unbuckled condition of a vehicle seat belt comprising the steps of:
   detecting a state of a vehicle ignition between an off position and an on position;
   detecting a first state of the vehicle seat belt between a buckled and unbuckled condition;
   producing an output signal and triggering a primary warning system for producing one of an audible and visible indicator of the seat belt in the unbuckled condition in response to detecting the first state of the seat belt in the unbuckled condition and the vehicle ignition in the on position for a first predetermined period of time;
   disarming the triggering of the primary warning system after expiration of the first predetermined period of time;
   detecting a second state of the vehicle seat belt between a buckled and unbuckled condition;
   producing an output signal and triggering a secondary warning system for producing one of an audible and visible indicator of the seat belt in the unbuckled condition in response to detecting the second state of the seat belt in the unbuckled condition and the vehicle ignition in the on position; and
   disarming the triggering of the secondary warning system in response to detecting a predetermined condition.

14. A method as set forth in claim 13 including disarming the triggering of the secondary warning system in response to detecting the second state of the seat belt in the buckled condition.

15. A method as set forth in claim 13 including disarming the triggering of the secondary warning system in response to detecting the vehicle ignition in the off position.

16. A method as set forth in claim 13 including disarming the triggering of the secondary warning system after detecting a second predetermined period of time.

17. A method as set forth in claim 13 including detecting a speed of the vehicle after detecting the second state of the seat belt in the unbuckled condition.

18. A method as set forth in claim 17 including producing an output signal and triggering the secondary warning system for producing one of an audible and visible indicator of the seat belt in the unbuckled condition in response to detecting the second state of the seat belt in the unbuckled condition, the vehicle ignition in the on position, and the detected vehicle speed is above a predetermined threshold.

19. A method of programming a secondary warning system between an enabled status for alerting a vehicle occupant when a seat belt is unbuckled and a disabled status wherein the vehicle includes a seat belt and the secondary warning system includes a control module connected to an ignition switch, a headlamp switch and a visible indicator, said method including the steps of:
   initializing the secondary warning system by positioning the ignition switch in an off position and the seat belt in an unbuckled condition;
   activating the ignition switch from the initialized off position to an on position;
   manipulating the seat belt a predetermined number of cycles between a buckled condition and the unbuckled condition;
   activating the headlamp switch between a selective on position and an off position;
   manipulating the seat belt a predetermined number of cycles between the buckled condition and the unbuckled condition;
   confirming activation of the visible indicator between a selective illuminated state and an off condition;
   manipulating the seat belt a final predetermined number of cycles between the buckled condition and the unbuckled condition; and
   checking the secondary warning system for confirmation of the state of the system between the enabled and disable status.

20. A method as set forth in claim 19 further including manipulating the seat belt between the buckled and unbuckled condition within a predetermined period of time after activating the ignition switch from the initialized off position to the on position.

* * * * *